(12) United States Patent
Vuk

(10) Patent No.: US 8,439,021 B2
(45) Date of Patent: May 14, 2013

(54) EGR SYSTEM FOR AN INTERNAL COMBUSTION ENGINE

(75) Inventor: Carl T. Vuk, Denver, IA (US)

(73) Assignee: Deere & Company, Moline, IL (US)

( * ) Notice: Subject to any disclaimer, the term of this patent is extended or adjusted under 35 U.S.C. 154(b) by 549 days.

(21) Appl. No.: 12/815,897

(22) Filed: Jun. 15, 2010

(65) Prior Publication Data

US 2011/0303199 A1    Dec. 15, 2011

(51) Int. Cl.
*F02M 25/07*    (2006.01)
*F02B 47/08*    (2006.01)
*F02B 33/44*    (2006.01)

(52) U.S. Cl.
USPC ............ 123/568.13; 123/568.12; 123/568.2; 123/58.8; 60/605.2

(58) Field of Classification Search .... 123/90.15–90.18, 123/58.8, 568.11–568.14, 568.2; 701/108; 60/605.2
See application file for complete search history.

(56) References Cited

U.S. PATENT DOCUMENTS

| | | | | | |
|---|---|---|---|---|---|
| 4,109,625 | A | * | 8/1978 | Kawamura et al. ...... | 123/568.13 |
| 5,203,310 | A | * | 4/1993 | Gatellier .................. | 123/568.13 |
| 6,347,619 | B1 | * | 2/2002 | Whiting et al. .......... | 123/568.12 |
| 6,386,154 | B1 | * | 5/2002 | Hellman et al. ......... | 123/568.13 |
| 6,868,842 | B2 | * | 3/2005 | Strawbridge ............ | 123/568.13 |
| 6,945,236 | B2 | * | 9/2005 | Nakai et al. ............. | 123/568.12 |
| 7,472,696 | B2 | * | 1/2009 | Easley et al. ............ | 123/568.21 |
| 7,556,027 | B2 | * | 7/2009 | Duret ....................... | 123/568.13 |
| 7,841,324 | B2 | * | 11/2010 | Dirker et al. ............ | 123/568.13 |
| 2007/0235011 | A1 | * | 10/2007 | Easley et al. ............ | 123/568.13 |

FOREIGN PATENT DOCUMENTS

WO    2009105463 A2    8/2009

* cited by examiner

*Primary Examiner* — Willis R Wolfe, Jr.
(74) *Attorney, Agent, or Firm* — Taylor IP, P.C.

(57) ABSTRACT

An EGR system for an IC engine, wherein the IC engine includes a block defining a plurality of combustion cylinders, a plurality of multi-valve heads, each multi-valve head associated with a respective combustion cylinder and including an inlet valve and an exhaust valve, an exhaust manifold fluid coupled with each exhaust valve, and an intake manifold fluidly coupled between the exhaust manifold and each inlet valve. The EGR system includes:
 a plurality of EGR inlet valves and a plurality of EGR exhaust valves, wherein each multi-valve head includes at least one EGR inlet valve and at least one EGR exhaust valve;
 an EGR exhaust manifold fluidly coupled with each EGR exhaust valve; and
 an EGR intake manifold fluidly coupled between the EGR exhaust manifold and each EGR inlet valve.

22 Claims, 1 Drawing Sheet

EGR SYSTEM FOR AN INTERNAL COMBUSTION ENGINE

FIELD OF THE INVENTION

The present invention relates to internal combustion engines, and, more particularly, to exhaust gas recirculation systems in such engines.

BACKGROUND OF THE INVENTION

An internal combustion (IC) engine may include an exhaust gas recirculation (EGR) system for controlling the generation of undesirable pollutant gases and particulate matter in the operation of IC engines. EGR systems primarily recirculate the exhaust gas by-products into the intake air supply of the IC engine. The exhaust gas which is reintroduced to the engine cylinder reduces the concentration of oxygen therein, which in turn lowers the maximum combustion temperature within the cylinder and slows the chemical reaction of the combustion process, decreasing the formation of nitrous oxides (NOx). Furthermore, the exhaust gases typically contain unburned hydrocarbons which are burned on reintroduction into the engine cylinder, which further reduces the emission of exhaust gas by-products which would be emitted as undesirable pollutants from the IC engine.

An IC engine may also include one or more turbochargers for compressing a fluid which is supplied to one or more combustion chambers within corresponding combustion cylinders. Each turbocharger typically includes a turbine driven by exhaust gases of the engine and a compressor which is driven by the turbine. The compressor receives the fluid to be compressed and supplies the fluid to the combustion chambers. The fluid which is compressed by the compressor may be in the form of combustion air or a fuel and air mixture.

When utilizing EGR in a turbocharged diesel engine, the exhaust gas to be recirculated is typically removed upstream of the exhaust gas driven turbine associated with the turbocharger. In many EGR applications, the exhaust gas is diverted by a poppet-type EGR valve directly from the exhaust manifold. The percentage of the total exhaust flow which is diverted for introduction into the intake manifold of an internal combustion engine is known as the EGR rate of the engine.

EGR has proven effective in reducing NOx emissions from modern diesel engines. EGR rates of up to 50% may be needed for tier 4 engines if selective catalytic reduction (SCR) is to be eliminated. Variable geometry turbochargers may be needed to increase exhaust pressures so as to drive exhaust gases into the intake system of high pressure loop EGR systems. The impact of the higher exhaust pressures significantly increases pumping losses, and raises peak firing pressures. It is also difficult to drive EGR levels high enough to meet NOx regulations without aftertreatment. Cooling loads also increase significantly with high EGR levels.

What is needed in the art is an EGR system that can operate at high EGR levels in a high pressure loop EGR system.

SUMMARY OF THE INVENTION

The invention in one form is directed to an IC engine, including a block defining a plurality of combustion cylinders. A plurality of multi-valve heads are respectively associated with a corresponding combustion cylinder, with each multi-valve head having an inlet valve, an EGR inlet valve, an exhaust valve and an EGR exhaust valve. An exhaust manifold is fluid coupled with each exhaust valve, and an EGR exhaust manifold is fluidly coupled with each EGR exhaust valve. An intake manifold is fluidly coupled between the exhaust manifold and each inlet valve, and an EGR intake manifold is fluidly coupled between the EGR exhaust manifold and each EGR inlet valve.

The invention in another form is directed to an EGR system for an IC engine, wherein the IC engine includes a block defining a plurality of combustion cylinders, a plurality of multi-valve heads, each multi-valve head associated with a respective combustion cylinder and including an inlet valve and an exhaust valve, an exhaust manifold fluidly coupled with each exhaust valve, and an intake manifold fluidly coupled between the exhaust manifold and each inlet valve. The EGR system includes:

a plurality of EGR inlet valves and a plurality of EGR exhaust valves, wherein each multi-valve head includes at least one EGR inlet valve and at least one EGR exhaust valve;

an EGR exhaust manifold fluidly coupled with each EGR exhaust valve; and an EGR intake manifold fluidly coupled between the EGR exhaust manifold and each EGR inlet valve.

DETAILED DESCRIPTION OF THE INVENTION

Figure 1:
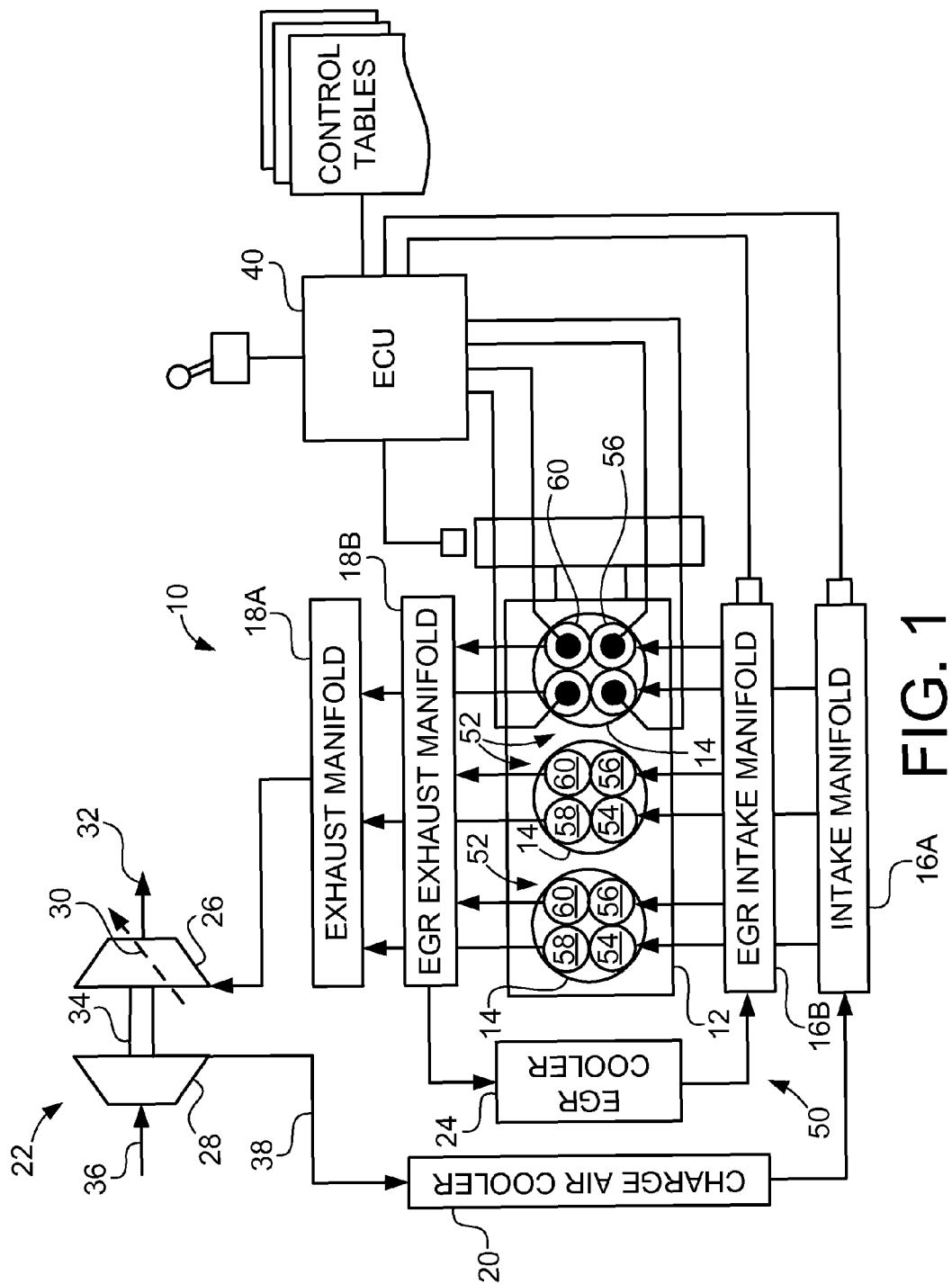
FIG. 1 is a schematic view of an IC engine including an embodiment of an EGR system of the present invention.

Referring now to FIG. 1, there is shown an embodiment of an IC engine 10 of the present invention, which generally includes a block 12 having a plurality of combustion cylinders 14, intake manifold 16A, EGR intake manifold 16B, exhaust manifold 18A, EGR exhaust manifold 18B, charge air cooler 20, turbocharger 22, and EGR cooler 24. In the embodiment shown, IC engine 10 is a diesel engine which is incorporated into a work machine, such as an agricultural tractor or combine, but may be differently configured, depending upon the application.

Block 12 is typically a cast metal block which is formed to define combustion cylinders 14. In the embodiment shown, block 12 includes three combustion cylinders 14, but may include a different number depending upon the application. Intake manifold 16A and exhaust manifold 18A are also typically formed from cast metal, and are coupled with block 12 in conventional manner, such as by using bolts and gaskets. Intake manifold 16A and exhaust manifold 18A are each in fluid communication with combustion cylinders 14. Intake manifold 16A receives charge air from charge air cooler 20, and supplies charge air (which may be air or a fuel/air mixture) to combustion cylinders 14, such as by using fuel injectors (not shown). Similarly, exhaust manifold 18A is in fluid communication with combustion cylinders 14, and provides exhaust gas from combustion cylinders 14 to turbocharger 22.

Turbocharger 22 is shown as having a fixed geometry turbine 26 and compressor 28. The present invention allows the use of a fixed geometry turbine which is less expensive and less complicated. However, for certain applications, it may be desirable to provide turbocharger 22 with a variable geometry turbine (VGT). Such a VGT can be adjustably controllable as indicated by dashed line 30, and may include an actuatable element such as controllable blades, a variable size orifice, or other actuatable elements (not shown). Turbine 26 is driven by exhaust gas from exhaust manifold 18A, and is exhausted to the environment, as indicated by arrow 32.

Turbine 26 mechanically drives compressor 28 through a rotatable shaft 34. Compressor 28 is a fixed geometry compressor in the embodiment shown. Compressor 28 receives combustion air from the ambient environment as indicated by line 36, and discharges the compressed combustion air via line 38 to charge air cooler 20. As a result of the mechanical work through the compression of the combustion air, the heated charge air is cooled in charge air cooler 20 prior to being introduced to the inlet of intake manifold 16A.

The controllable components of IC engine 10 shown in FIG. 1 are generally under the control of an electrical processing circuit, which in the illustrated embodiment is in the form of an engine control unit (ECU) 40.

EGR system 50 includes a plurality of multi-valve heads 52, EGR exhaust manifold 18B, EGR cooler 24, and EGR intake manifold 16A, which are interconnected together by a plurality of respective fluid lines (not numbered). The term fluid line, as used herein, is intended broadly to cover a conduit for transporting a gas such as exhaust gas and/or combustion air, as will be understood hereinafter.

Multi-valve heads 52 are each associated with a respective combustion cylinder 14. Each multi-valve head 52 includes an inlet valve 54, an EGR inlet valve 56, an exhaust valve 58 and an EGR exhaust valve 60. It is possible that each multi-valve head 52 may have more than the specified four valves, but at least has four valves as indicated.

EGR exhaust manifold 18B is fluidly coupled with each EGR exhaust valve 60, and EGR intake manifold 16B is fluidly coupled between EGR exhaust manifold 18B and each EGR inlet valve 56. EGR cooler 24 fluidly interconnects EGR exhaust manifold 18B and EGR intake manifold 16B and cools the recirculated exhaust gases prior to introduction into combustion cylinders 14. Intake manifold 16A and EGR intake manifold 16B are physically separate from each other in the illustrated embodiment, but may also be incorporated into a common manifold arrangement. Regardless, intake manifold 16A and EGR intake manifold 16B are fluidly separate manifolds relative to each other. Similarly, exhaust manifold 18A and EGR exhaust manifold 18B are physically separate from each other in the illustrated embodiment, but may also be incorporated into a common manifold arrangement.

ECU 40 is configured to control with variable valve actuation each of inlet valve 54, EGR inlet valve 56, exhaust valve 58, and EGR exhaust valve 60 with an EGR rate of up to approximately 50%. ECU 40 is configured to open each exhaust valve 58 during an earlier portion of a corresponding exhaust stroke, and to open each EGR exhaust valve 60 during a later portion of the same exhaust stroke. In this manner, the higher pressure exhaust gases which are discharged to turbocharger 22 during the earlier portion of the exhaust stroke provide a higher blowdown energy to turbocharger 22. This allows EGR system 50 to be operated as a high pressure loop EGR system.

In summary, EGR system 50 of the present invention may be used with high performance diesel engines, which are typically equipped with four valve heads. This is done mostly to get the nozzle centered and vertical rather than to significantly impact engine breathing. By reallocating one inlet valve as an EGR inlet valve 56, and one exhaust valve as an EGR exhaust valve 60, externally cooled EGR can be provided. Valve timing is adjusted to drive high levels of EGR without restricting the exhaust. By timing the opening of EGR inlet valve 56 and EGR exhaust valve 60, relative levels of EGR can be controlled without the use of additional external valves or variable geometry turbochargers. The exhaust manifold 18A and EGR exhaust manifold 18B preferably have separate plenums for EGR and exhaust that feed turbocharger 22. Likewise, the intake system also has separate ports and runners for air and EGR gases. The EGR exhaust ports are connected to the EGR inlet ports through EGR cooler 24. Variable valve actuation is an ideal way to actively control individual cylinder EGR rates. The exhaust blowdown energy can be directed to a high efficiency, fixed geometry turbocharger. It may be possible to time EGR inlet phasing such that an exhaust pulse from another cylinder feeds EGR without the need for elevated average pressure increases. Control of runner length effectively creates a resonator that can help with pressure balance. By using the late part of the exhaust stroke for EGR, temperatures are cooler and heat rejection is reduced. By eliminating the need for high exhaust restrictions, the pressure of the entire cycle can be reduced. Since variable valve actuation is beneficial, it is possible to also control the operating point of turbocharger 22 in a fixed geometry turbocharger by adjusting exhaust valve opening timing. This can produce higher pressure ratios in addition to improved turbocharger efficiency.

Having described the preferred embodiment, it will become apparent that various modifications can be made without departing from the scope of the invention as defined in the accompanying claims.

The invention claimed is:

1. An internal combustion (IC) engine, comprising:
 a block defining a plurality of combustion cylinders;
 a plurality of multi-valve heads, each said multi-valve head associated with a respective said combustion cylinder, each said multi-valve head including an inlet valve, an EGR inlet valve, an exhaust valve and an EGR exhaust valve;
 an exhaust manifold fluid coupled with each said exhaust valve;
 an EGR exhaust manifold fluidly coupled with each said EGR exhaust valve;
 an intake manifold fluidly coupled to each said inlet valve; and
 an EGR intake manifold fluidly coupled between said EGR exhaust manifold and each said EGR inlet valve.

2. The IC engine of claim 1, wherein each said multi-valve head has a total of four valves.

3. The IC engine of claim 1, wherein said exhaust manifold and said EGR exhaust manifold are physically separate from each other or incorporated into a common manifold arrangement.

4. The IC engine of claim 1, further including an EGR cooler fluidly interconnecting said EGR exhaust manifold and said EGR intake manifold.

5. The IC engine of claim 1, further including an electrical processing circuit configured to control with variable valve actuation each of said inlet valve, said EGR inlet valve, said exhaust valve, and said EGR exhaust valve.

6. The IC engine of claim 5, wherein said electrical processing circuit is configured to control each of said inlet valve, said EGR inlet valve, said exhaust valve, and said EGR exhaust valve with an EGR rate of up to approximately 50%.

7. The IC engine of claim 5, wherein said electrical processing circuit is configured to open each said exhaust valve during an earlier portion of a corresponding exhaust stroke, and to open each said EGR exhaust valve during a later portion of the same exhaust stroke.

8. The IC engine of claim 5, wherein said electrical processing circuit is configured to open each said EGR exhaust valve during a later portion of an exhaust stroke within a corresponding said cylinder.

9. The IC engine of claim 5, further including a turbocharger interconnected between said exhaust manifold and said intake manifold, and wherein said electrical processing circuit is configured to open each said exhaust valve during an earlier portion of an exhaust stroke to provide blowdown energy to said turbocharger.

10. The IC engine of claim 9, wherein said turbocharger has a fixed geometry turbine or a variable geometry turbine.

11. The IC engine of claim 9, further including a charge air cooler fluidly interconnecting said turbocharger and said intake manifold.

12. An exhaust gas recirculation (EGR) system for an internal combustion engine (IC), the IC engine including a block defining a plurality of combustion cylinders, a plurality of multi-valve heads, each said multi-valve head associated with a respective combustion cylinder and including an inlet valve and an exhaust valve, an exhaust manifold fluid coupled with each said exhaust valve, and an intake manifold fluidly coupled to each said inlet valve, said EGR system comprising:

a plurality of EGR inlet valves and a plurality of EGR exhaust valves, wherein each said multi-valve head includes at least one EGR inlet valve and at least one EGR exhaust valve;

an EGR exhaust manifold fluidly coupled with each said EGR exhaust valve; and an EGR intake manifold fluidly coupled between said EGR exhaust manifold and each said EGR inlet valve.

13. The EGR system of claim 12, wherein each said multi-valve head has a total of four valves.

14. The EGR system of claim 12, wherein said exhaust manifold and said EGR exhaust manifold are physically separate from each other or incorporated into a common manifold arrangement.

15. The EGR system of claim 12, further including an EGR cooler fluidly interconnecting said EGR exhaust manifold and said EGR intake manifold.

16. The EGR system of claim 12, further including an electrical processing circuit configured to control with variable valve actuation each of said inlet valve, said EGR inlet valve, said exhaust valve, and said EGR exhaust valve.

17. The EGR system of claim 16, wherein said electrical processing circuit is configured to control each of said inlet valve, said EGR inlet valve, said exhaust valve, and said EGR exhaust valve with an EGR rate of up to approximately 50%.

18. The EGR system of claim 16, wherein said electrical processing circuit is configured to open each said exhaust valve during an earlier portion of a corresponding exhaust stroke, and to open each said EGR exhaust valve during a later portion of the same exhaust stroke.

19. The EGR system of claim 16, wherein said electrical processing circuit is configured to open each said EGR exhaust valve during a later portion of an exhaust stroke within a corresponding said cylinder.

20. The EGR system of claim 16, further including a turbocharger interconnected between said exhaust manifold and said intake manifold, and wherein said electrical processing circuit is configured to open each said exhaust valve during an earlier portion of an exhaust stroke to provide blowdown energy to said turbocharger.

21. The EGR system of claim 20, wherein said turbocharger has a fixed geometry turbine or a variable geometry turbine.

22. The EGR system of claim 20, further including a charge air cooler fluidly interconnecting said turbocharger and said intake manifold.

\* \* \* \* \*